(12) United States Patent
Topoulos

(10) Patent No.: US 9,193,866 B2
(45) Date of Patent: *Nov. 24, 2015

(54) PORTABLE ELECTRONIC DEVICE COVER COMPRISING RENEWABLE POLYAMIDE RESIN COMPOSITION

(75) Inventor: Georgios Topoulos, Meyrin (CH)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 999 days.

This patent is subject to a terminal disclaimer.

(21) Appl. No.: 12/436,160

(22) Filed: May 6, 2009

(65) Prior Publication Data

US 2009/0281229 A1  Nov. 12, 2009

Related U.S. Application Data

(60) Provisional application No. 61/126,879, filed on May 8, 2008.

(51) Int. Cl.
   C08K 3/36 (2006.01)
   C08K 3/08 (2006.01)
   C08K 3/34 (2006.01)
   C08L 77/06 (2006.01)

(52) U.S. Cl.
   CPC ..................... *C08L 77/06* (2013.01)

(58) Field of Classification Search
   USPC ......... 524/441, 449, 13, 606, 9, 15, 425, 451, 524/447, 423, 435, 413, 508, 514, 492, 493
   See application file for complete search history.

(56) References Cited

U.S. PATENT DOCUMENTS

| | | | |
|---|---|---|---|
| 3,264,272 A | 8/1966 | Rees | |
| 3,869,429 A | 3/1975 | Blades | |
| 5,104,924 A * | 4/1992 | Goetz et al. | 524/508 |
| 6,004,784 A | 12/1999 | Mobley | |
| 6,066,480 A | 5/2000 | Mobley | |
| 6,689,835 B2 * | 2/2004 | Amarasekera et al. | 524/495 |
| 2003/0004248 A1 * | 1/2003 | Wakamura et al. | 524/441 |
| 2007/0155877 A1 * | 7/2007 | Shinohara | 524/195 |

FOREIGN PATENT DOCUMENTS

| | | | |
|---|---|---|---|
| EP | 376616 A2 * | 7/1990 | C08K 7/02 |
| WO | WO2008/066762 | 6/2008 | |
| WO | WO2008/104719 | 9/2008 | |

OTHER PUBLICATIONS

DuPont (Oct. 23, 2007) Dupont Expands Portfolio of Renewably Sourced Polymers. SpecialChem. Available Online at: www.specialchem4cosmetics.com/services/news.aspx?id=2473.*
XP002536107,WO/2007-080754, Mitsubishi Eng. Plastic. Jul. 17, 2007 Abstract.
XP002536108, WO2007/138743, Mitsubishi Eng. Plastic Corp. JP Dec. 6, 2007, Abstract.
Norton G A et al. Determining the Modern Carbon etc., Bioresource Technology, Nov. 1, 2006.

* cited by examiner

*Primary Examiner* — Ling Choi
*Assistant Examiner* — Thuy-Al Nguyen

(57) ABSTRACT

The invention discloses a portable electronic device cover comprising renewable thermoplastic polyamide compositions having a carbon content, wherein the carbon content comprises at least 50 percent modern carbon, as determined with ASTM-D6866 method.

10 Claims, 2 Drawing Sheets

PORTABLE ELECTRONIC DEVICE COVER COMPRISING RENEWABLE POLYAMIDE RESIN COMPOSITION

FIELD OF THE INVENTION

The present invention relates to a portable electronic device cover including a polyamide composition wherein the polyamide is partially or entirely derived from renewable resources.

BACKGROUND OF THE INVENTION

Portable electronic devices, such as mobile telephones, personal digital assistants, laptop computers, tablet computers, global positioning system receivers, portable games, radios, cameras and camera accessories, and the like are becoming increasingly widely used globally. The portable electronic device industry and their suppliers are increasingly concerned about the environmental footprint, greenhouse gas emissions and depletion of natural resources. Therefore it is increasingly desirable or necessary to use materials derived from renewable resources and having overall low negative environmental impact.

Portable electronic device covers are a particularly demanding materials application. They provide protection of internal components from impact and from contamination. It is thus important that the materials used for portable electronic device covers have high impact resistance. The poly (lactic acid) (PLA) is a polymer derived from renewable resources used in limited cases in portable electronic device covers. But PLA has low mechanical properties and is not widely used.

Additionally, hand held electronic devices such as mobile phones often have antenna inside of housing protected by cover. For optimal functioning of a mobile telephones it is often necessary for the cover be as transparent as possible to electromagnetic radiation having frequencies in the range of about to 40 MHz to 6 GHz and that the material's response to such electromagnetic radiation not vary significantly as a result of environment conditions such as temperature and relative humidity. Otherwise, the amplitude of the radio signals sent and received by the telephone can be affected, resulting in a lost or weakened connection or requiring increased power consumption to maintain a signal at a desirable level. Polycarbonate/acrylonitrile-butadiene-styrene (ABS) has good radio transparency and good impact resistance, and has been a standard material for mobile phones covers. However it does not contain any renewable content.

Thermoplastic polyamide compositions are desirable for use in making mobile telephone covers because they exhibit good physical properties and are conveniently and flexibly molded into a variety of articles of varying degrees of complexity and intricacy. However, many polyamides absorb significant amounts of moisture when exposed to atmospheric conditions, which may decrease the transparency of the compositions to 40 MHz to 6 GHz electromagnetic radiation. Typically, the greater the level of moisture absorbed by the composition, the less transparent the composition is to 40 MHz to 6 GHz electromagnetic radiation. Polyamide 12, for example, has good resistance to moisture absorption, but it typically does not contain any renewable carbon content. Polyamide 11 is derived from renewable resources and has low moisture absorption but exhibits low tensile modulus. Thus, when used in covers does not provide sufficient mechanical protection.

Another important attribute of hand held electronic device covers is that they be readily painted. Polyamide 11 and Polyamide 12 are very difficult to paint.

Thus there is a need for hand held electronic covers that includes a polyamide composition, being partially or entirely derived from renewable resources; and also having a combination of good mechanical properties, low moisture absorption and paintability.

SUMMARY OF THE INVENTION

One embodiment of the invention is a portable electronic device cover comprising a renewable thermoplastic composition comprising:

(a) 70.1 to 100 wt % of at least one polyamide selected from the group consisting of polyamide 9,10; polyamide 9,12; polyamide 9,14; polyamide 9,16; polyamide 9,36; polyamide 6,10; polyamide 6,12; polyamide 6,14; polyamide 6,16; polyamide 6,18; polyamide 6,36; polyamide 10,10; polyamide 10,12; polyamide 10,13; polyamide 10,14; polyamide 10,15 polyamide 10,16; polyamide 10,18; polyamide 10,36; polyamide 10T/1010; polyamide 10I/1010; polyamide 12,10; copolymers of two or more thereof; and blends thereof; the at least one polyamide having a carbon content, wherein the carbon content comprises at least 50 percent modern carbon, as determined with ASTM-D6866 method;

(b) 0 to 29.9 wt % of at least one fibrous reinforcing agent having circular type cross-section;

(c) 0 to 14.9 wt % of at least one fibrous reinforcing agent having non circular type cross-section;

(d) 0 to 29.9 wt % glass flake;

(e) 0 to 29.9 wt % of at least one mineral reinforcing agent; and (f) 0 to 29.9 wt % of at least one impact modifier agent;

wherein the wt % of (a), (b), (c), (d), (e) and (f) are based on the total weight of the thermoplastic composition.

DETAILED DESCRIPTION OF THE INVENTION

Figure 1:
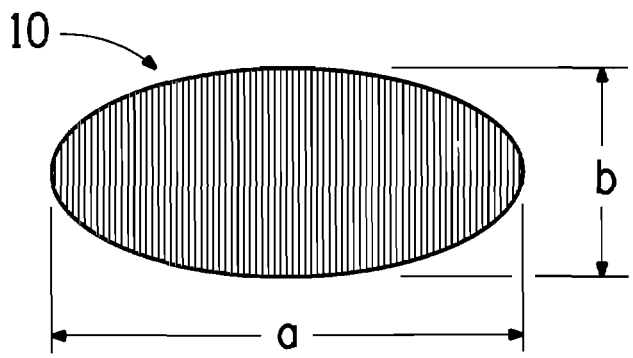
FIG. 1 is a cross-sectional view of a fibrous reinforcing agent having a non-circular cross section where the cross section has a major axis and a minor axis.

By "portable electronic device cover" is meant an external envelop covering all internal components such as electronics, batteries and structural components onto which other elements of the portable electronic devices such as electronics, screens, battery sockets, and the like are mounted.

Examples of polyamides suitable for use as polyamide (a) are selected from the group consisting of polyamide 9,10;

polyamide 9,12; polyamide 9,14; polyamide 9,16; polyamide 9,36; polyamide 6,10; polyamide 6,12; polyamide 6,14; polyamide 6,16; polyamide 6,18; polyamide 6,36; polyamide 10,10; polyamide 10,12; polyamide 10,13; polyamide 10,14; polyamide 10,15 polyamide 10,16; polyamide 10,18; polyamide 10,36; polyamide 10T/1010; polyamide 10I/1010; polyamide 12,10; copolymers of two or more thereof; and blends thereof. Preferred polyamides for use as polyamide (a) are selected from the group consisting of polyamide 6,10; polyamide 10,10; polyamide 10,10; and polyamide 10T/1010; copolymers of two or more thereof; and blends thereof.

Preferred blends of polyamides blends are selected from the group consisting of polyamide 6,10; polyamide 10,10; and polyamide 10T/1010; copolymers of two or more thereof; and blends thereof.

In one embodiment the polyamide is polyamide 10,10.

The polyamides useful in the invention are prepared from aliphatic dioic acids and aliphatic diamines, at least one of which is bio-sourced or "renewable". By "bio-sourced" is meant that the primary feed-stock for preparing the dioic acid and/or diamine is a renewable biological source, for instance, vegetable matter including grains, vegetable oils, cellulose, lignin, fatty acids; and animal matter including fats, tallow, oils such as whale oil, fish oils, and the like. These bio-sources of dioic acids and aliphatic diamines have a unique characteristic in that they all possess high levels of the carbon isotope $^{14}C$; as compared to fossil or petroleum sources of the dioic acids and aliphatic diamines. This unique isotope feature remains unaffected by non-nuclear, conventional chemical modifications. Thus the $^{14}C$ isotope level in bio-sourced materials provides an unalterable feature that allows any downstream products, such as polyamides; or products comprising the polyamides such as electrical housings, to be unambiguously identified as comprising a bio-sourced material. Furthermore, the analysis of $^{14}C$ isotope level in dioic acids, diamines and downstream product is sufficiently accurate to verify the percentage of bio-sourced carbon in the downstream product.

The polyamides useful in the invention are prepared from aliphatic dioic acids and aliphatic diamines using conventional chemical methods as are well known in the art of polyamides.

Bio-sources of the aliphatic dioic acids are available by well known fermentation processes combined with conventional isolation and purification processes. For instance, 1,14-Tetradecanedioic acid is available by biofermentation of methyl myristate using Candida tropicalis according to the procedures disclosed in U.S. Pat. Nos. 6,004,784 and 6,066,480, hereby incorporated by reference. Other α,ω-alkanedicarboxylic acids are also available using similar fermentation methods with other fatty acids, or fatty esters. The aliphatic dioic acids can be isolated from the fermentation broth using well known procedures in the art. For instance, GB patent 1,096,326, disclose the ethyl acetate extraction of a fermentation broth, followed by esterification of the extract with methanol and sulfuric acid catalysis to provide the corresponding dimethyl ester of the dioic acid.

A specific example of a bio-sourced aliphatic dioic acid available commercially is sebacic acid (C10 dioic acid), that is derived from castor oil. The bio-sourced acid can be purchased from Hengshui Dongfeng Chemical Co. Ltd., HengShui, China.

The aliphatic dioic acids derived from bio-sources, as disclosed above, can be converted to aliphatic diamines by conventional chemical methods such as disclosed in Chinese Patent 101088983, Dec. 19, 2007 entitled "Preparation of dodecanedioic acid decanediamine salt for use synthesizing polyamides." Reacting decanedioic acid with ammonia at 134-200° C., followed by dehydration of the diamide at 200-400° C., provides sebacic dinitrile, that can be hydrogenated in the presence of Raney nickel catalyst in ethanol-potassium hydroxide solution at 50-125° C., to provide the 1,10-decanediamine. Other α,ω-alkanedicarboxylic acids can be converted to α,ω-alkane diamines using similar methods. Thus, the combination of fermentation and conventional chemical synthesis as disclosed above provides a bio-sourced family of α,ω-alkane diamines suitable for polyamide synthesis.

The at least one polyamide useful in the renewable thermoplastic composition has a carbon content wherein the carbon content comprises at least 50 percent modern carbon (pMC), as determined with the ASTM-D6866 Biobased Determination method. In other embodiments the polyamide has a carbon content of at least 60, 70, 80, 90, and 98 pMC, respectively, as determined with the ASTM-D6866 Method.

The ASTM-D6866 method to derive a "Biobased content" is built on the same concepts as radiocarbon dating, but without use of the age equations. The method relies on determining a ratio of the amount of radiocarbon ($^{14}C$) in an unknown sample to that of a modern reference standard. The ratio is reported as a percentage with the units "pMC" (percent modern carbon). If the material being analyzed is a mixture of present day radiocarbon and fossil carbon (fossil carbon being derived from petroleum, coal, or a natural gas source), then the pMC value obtained correlates directly to the amount of Biomass material present in the sample.

The modern reference standard used in radiocarbon dating is a National Institute of Standards and Technology—USA (NIST-USA) standard with a known radiocarbon content equivalent approximately to the year AD 1950. AD 1950 was chosen since it represented a time prior to thermo-nuclear weapons testing which introduced large amounts of excess radiocarbon into the atmosphere with each explosion (termed "bomb carbon"). This was a logical point in time to use as a reference for archaeologists and geologists. For those using radiocarbon dates, AD 1950 equals "zero years old". It also represents 100 pMC.

"Bomb carbon" in the atmosphere reached almost twice normal levels in 1963 at the peak of testing and prior to the treaty halting the testing. Its distribution within the atmosphere has been approximated since its appearance, showing values that are greater than 100 pMC for plants and animals living since AD 1950. It's gradually decreased over time with today's value being near 107.5 pMC. This means that a fresh biomass material such as corn, vegetable oils, etc, and materials derived therefrom, would give a radiocarbon signature near 107.5 pMC.

The radiocarbon dating isotope ($^{14}C$), with its nuclear half life of 5730 years, clearly allows one to apportion specimen carbon between fossil carbon ("dead") and biospheric ("alive") feedstocks. Fossil carbon, depending upon its source, has very close to zero $^{14}C$ content.

Combining fossil carbon with present day carbon into a material will result in a dilution of the present day pMC content. By presuming 107.5 pMC represents present day biomass materials and 0 pMC represents petroleum (fossil carbon) derivatives, the measured pMC value for that material will reflect the proportions of the two component types. Thus, a material derived 100% from present day vegetable oil would give a radiocarbon signature near 107.5 pMC. If that material was diluted with 50% petroleum derivatives, it would give a radiocarbon signature near 54 pMC.

A biomass content result is derived by assigning 100% equal to 107.5 pMC and 0% equal to 0 pMC. In this regard, a sample measuring 99 pMC will give an equivalent Biobased content result of 93%. This value is referred to as the "Mean Biobased Result" and assumes all the components within the analyzed material were either present day living or fossil in origin.

The results provided by the ASTM D6866 method are the Mean Biobased Result and encompasses an absolute range of 6% (plus and minus 3% on either side of the Mean Biobased Result) to account for variations in end-component radiocarbon signatures. It is presumed that all materials are present day or fossil in origin. The result is the amount of biobased component "present" in the material, not the amount of biobased material "used" in the manufacturing process.

Several commercial analytical laboratories have capabilities to perform ASTM-D6866 method. The analyses herein were conducted by Beta Analytics Inc. Miami Fla., USA.

A preferred embodiment is a device cover of wherein the polyamide has a carbon content of at least 90 percent modern carbon.

A fibrous reinforcing agent (b) having circular type cross-section is optionally present in the thermoplastic composition at 0 to 29.9 wt %, preferably from about 0.1 to about 29.9 wt %, and more preferably about 15 to 29.9 wt %, based on the total weight of the thermoplastic composition. Suitable fibrous reinforcing agents include long glass fibers, chopped strands, milled short glass fibers, or other suitable forms known to those skilled in the art, and carbon fibers including carbon nanotubes. Circular type cross-section means that a cross-section of the fiber perpendicular to a longitudinal direction of the reinforcing agent has a circular shape. In one embodiment the fibrous reinforcing agent having a circular type cross-section is glass fiber. Suitable glass fibrous reinforcing agents are disclosed in EP 0 190 001 and EP 0 196 194.

Figure 2A:
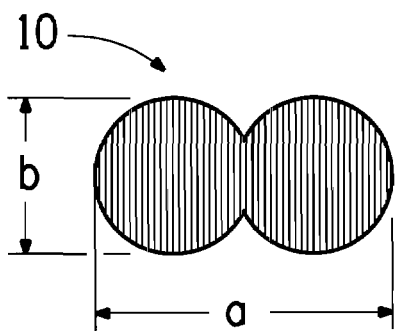
FIG. 2A is a cross-sectional view of a fibrous reinforcing agent having a cocoon-type non-circular cross section.
Figure 2B:
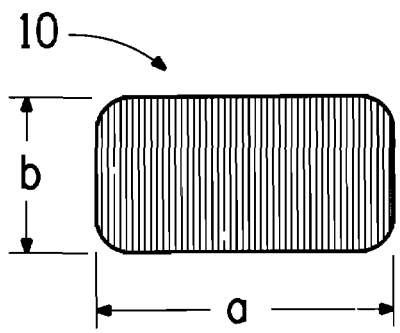
FIG. 2B is a cross-sectional view of a fibrous reinforcing agent having a rectangular non-circular cross section.
Figure 2C:
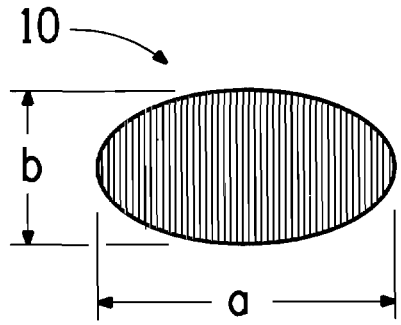
FIG. 2C is a cross-sectional view of a fibrous reinforcing agent having an elliptical non-circular cross section.
Figure 2D:
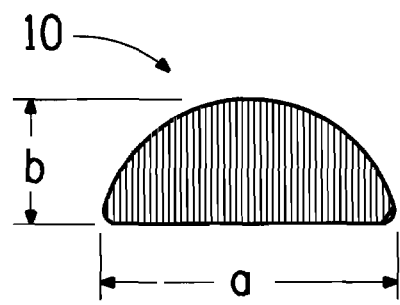
FIG. 2D is a cross-sectional view of a fibrous reinforcing agent having a semielliptical non-circular cross section.
Figure 2E:
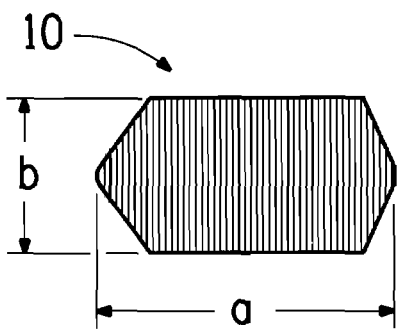
FIG. 2E is a cross-sectional view of a fibrous reinforcing agent having a roughly triangular non-circular cross section.
Figure 2F:
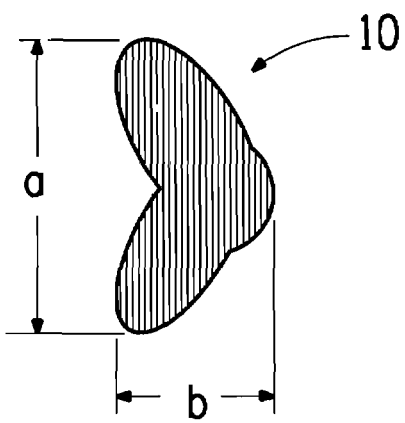
FIG. 2F is a cross-sectional view of a fibrous reinforcing agent having a polygonal non-circular cross section.
Figure 2G:
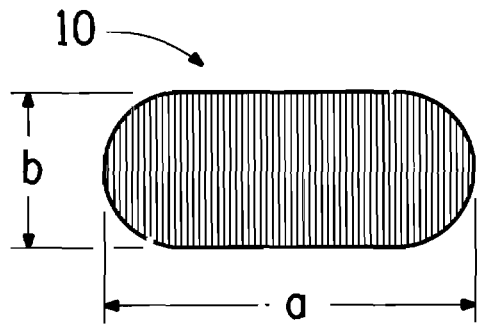
FIG. 2G is a cross-sectional view of a fibrous reinforcing agent having an oblong non-circular cross section.

A fibrous reinforcing agent (c) having a non-circular type cross-section is optionally present in the thermoplastic composition at 0 to 14.9 wt %, preferably from about 0.1 to about 14.9 wt %, and more preferably about 5 to 14.9 wt %, based on the total weight of the thermoplastic composition. The fibrous reinforcing agent having a non-circular cross-section has a major axis lying perpendicular to a longitudinal direction of the reinforcing agent and corresponding to the longest linear distance in the cross section. The non-circular cross section has a minor axis corresponding to the longest linear distance in the cross section iii a direction perpendicular to the major axis FIG. 1 shows a representative non-circular cross sectional view of a fiber 10 having a major axis a and a minor axis b. The non-circular cross section of the fiber 10 may have a variety of shapes. Representative shapes of the non-circular cross section of the fiber 10 are shown in FIG. 2, wherein the cross sections each have a major axis a and a minor axis b FIG. 2A shows a cocoon-type (figure-eight) shape; FIG. 2B shows a rectangular shape; FIG. 2C shows an elliptical shape; FIG. 2D shows a semielliptical shape; FIG. 2E shows a roughly triangular shape FIG. 2F shows a polygonal shape; and FIG. 2B shows an oblong shape. As will be understood by those skilled in the art, the cross section may have other shapes.

The ratio of the length of the major axis to that of the minor access is preferably between about 1.5:1 and about 6:1. The ratio is more preferably between about 2:1 and 5:1 and yet more preferably between about 3:1 to about 4:1.

A glass flake (d) is optionally present in the thermoplastic composition at 0 to 29.9 wt %, based on the total weight of the thermoplastic composition. In various embodiments the thermoplastic composition comprises 0.1 to 29.9 wt % glass flake, and 5 to 29.9 wt % glass flake. Suitable glass flake have a flaky or platy form and suitable materials are available from NGF, Japan A mineral reinforcing agent (e) is optionally present in the thermoplastic composition at 0 to 29.9 wt %, and preferably at 0.1 to 29.9 wt %, and more preferably at 15 to 29.9 wt %, based on the total weight of the thermoplastic composition. Suitable mineral reinforcing agents are wollastonite, talc, kaolin, calcium carbonate, and the like.

An impact modifier (f) is optionally present in the thermoplastic composition at 0 to about 29.9 wt %, more preferably at 0 to about 15 wt %, and more preferably in about 5 to about 15 wt %, based on the total weight of the thermoplastic composition.

Preferred impact modifiers include those typically used for polyamides, including carboxyl-substituted polyolefins, which are polyolefins that have carboxylic moieties attached thereto, either on the polyolefin backbone itself or on side chains. By "carboxylic moieties" is meant carboxylic groups such as one or more of dicarboxylic acids, diesters, dicarboxylic monoesters, acid anhydrides, and monocarboxylic acids and esters. Useful impact modifiers include dicarboxyl-substituted polyolefins, which are polyolefins that have dicarboxylic moieties attached thereto, either on the polyolefin backbone itself or on side chains. By 'dicarboxylic moiety' is meant dicarboxylic groups such as one or more of dicarboxylic acids, diesters, dicarboxylic monoesters, and acid anhydrides.

The impact modifier may preferably be based on an ethylene/α-olefin polyolefin. Diene monomers such as 1,4-hexadiene or dicyclopentadiene may optionally be used in the preparation of the polyolefin. Preferred polyolefins are ethylene-propylene-diene (EPDM) polymers made from 1,4-hexadiene and/or dicyclopentadiene. The carboxyl moiety may be introduced during the preparation of the polyolefin by copolymerizing with an unsaturated carboxyl-containing monomer. Preferred is a copolymer of ethylene and maleic anhydride monoethyl ester. The carboxyl moiety may also be introduced by grafting the polyolefin with an unsaturated compound containing a carboxyl moiety, such as an acid, ester, diacid, diester, acid ester, or anhydride. A preferred grafting agent is maleic anhydride. A preferred impact modifier is an ethylene-propylene-diene polymer grafted with 1 to 5 wt % maleic anhydride, such as Fusabond® N MF521D, which is commercially available from E. I. DuPont de Nemours & Co., Inc., Wilmington, Del. Blends of polyolefins, such as polyethylene, polypropylene, and EPDM polymers with polyolefins that have been grafted with an unsaturated compound containing a carboxyl moiety may be used as an impact modifier.

Suitable impact modifiers may also include ionomers. By an ionomer is meant a carboxyl group containing polymer that has been neutralized or partially neutralized with metal cations such as zinc, sodium, or lithium and the like. Examples of ionomers are described in U.S. Pat. Nos. 3,264,272 and 4,187,358, both incorporated by reference herein. Examples of suitable carboxyl group containing polymers include, but are not limited to, ethylene/acrylic acid copolymers and ethylene/methacrylic acid copolymers. The carboxyl group containing polymers may also be derived from one or more additional monomers, such as, but not limited to, butyl acrylate. Zinc salts are preferred neutralizing agents. Ionomers are commercially available under the Surlyn® trademark from E.I. du Pont de Nemours and Co., Wilmington, Del.

The compositions used in the present invention may optionally comprise additional additives such as ultraviolet fight stabilizers, heat stabilizers, antioxidants, processing aids, lubricants, flame retardants, and/or colorants (including dyes, pigments, carbon black, and the like).

The compositions used in the present invention are made by melt-blending the components using any known methods. The component materials may be mixed to uniformity using a melt-mixer such as a single or twin-screw extruder, blender, kneader, Banbury mixer, etc. to give a resin composition. Or, part of the materials may be mixed in a melt-mixer, and the rest of the materials may then be added and further melt-mixed until uniform.

The portable electronic device cover is made from the compositions using any suitable melt-processing method. Injection molding is a preferred method.

Materials

PA1010 is Zytel® FE110004 polyamide available from E.I. du Pont de Nemours and Company, Wilmington, Del.
PA610 is Zytel® FE210037 polyamide available from E.I. du Pont de Nemours and Company, Wilmington, Del.
Glass Fiber A refers to E-glass fibers having a number average diameter of about 10 microns and a circular cross section.
Glass Fiber B refers to CSG3PA820, glass fibers having a non-circular cross section supplied by Nitto Boseki Co. Ltd. (Nittobo) Tokyo, Japan.
Glass flakes refer to REF 160 A supplied by NGF, Japan.
Wollastonite refers to Nyglos® 8 supplied by Nyco Minerals, Willsboro, N.Y.

Methods

ASTM-D6866 Method B Biobased Determination method were conducted by Beta Analytics Inc. Miami Fla., USA, to determine the % biobased carbon.

Tensile properties (tensile modulus, stress at break, and strain at break) were measured according to ISO 527-2/5A at 23° C. on samples that were dry as molded.

Impact properties, unnotched Charpy and notched Charpy impact strengths were measured according to ISO 179/1eA and SO 179/1eU, respectively, at 23° C. on samples that were dry as molded.

The compositions in the Examples (abbreviated as "Ex." In the tables) were prepared by melt-compounding the ingredients shown in Table 1 and 2 in a twin-screw extruder.

TABLE 1

|  | Ex. 1 | Ex. 2 | Ex. 3 | Ex. 4 | Ex. 5 |
|---|---|---|---|---|---|
| Materials |  |  |  |  |  |
| Polyamide 10, 10 | 99.8 | 94.1 | 89.1 | 84.1 | 79.1 |
| Glass fibers A |  | 5 | 10 | 15 | 20 |
| Antioxidants |  | 0.6 | 0.6 | 0.6 | 0.6 |
| Lubricant | 0.2 | 0.3 | 0.3 | 0.3 | 0.3 |
| Properties |  |  |  |  |  |
| pMC, % | 99% |  |  |  |  |
| Tensile Modulus, GPa | 1.6 | 2.9 | 3.9 | 4.9 | 6.0 |
| Stress at Yield. MPa | 50 | 73 | 90 | 108 | 124 |
| Strain at Yield, % | 4.7 | 4.5 | 4.0 | 3.8 | 3.7 |
| Stress at Break, MPa | 44 | 67 | 89 | 104 | 120 |
| Strain at Break, % | 257 | 15.2 | 4.6 | 5.1 | 4.8 |
| Charpy Impact Notched, kJ/m$^2$ | 5.2 | 3.4 | 4.7 | 6.8 | 9.3 |
| Charpy Impact Unnotched, kJ/m$^2$ |  | 37.7 | 40.0 | 55.3 | 77.1 |

Quantities are given in wt % based on the total weight of the composition.
pMC is the % modern carbon as determined with ASTM-D6866 Method-B.

TABLE 2

|  | Ex. 6 | Ex. 7 | Ex. 8 | Ex. 9 | Ex. 10 | Ex. 11 | Ex. 12 |
|---|---|---|---|---|---|---|---|
| Materials |  |  |  |  |  |  |  |
| Polyamide 10, 10 | 80.00 | 90 | 86 | 75 | 75 |  |  |
| Polyamide 6, 10 |  |  |  |  |  | 80 | 86 |
| Glass fibers A | 20 |  |  |  |  | 20 |  |
| Glass fibers B |  | 10 | 14 |  |  |  | 14 |
| Glass flake |  |  |  | 25 |  |  |  |
| Wollastonite |  |  |  |  | 25 |  |  |
| Properties |  |  |  |  |  |  |  |
| pMC, % |  |  |  |  |  | 63% | 63% |
| Tensile Modulus, MPa | 4387 | 3232 | 3479 | 1979 | 2163 | 4733 | 4144 |
| Stress at Yield. MPa | 89.1 | 76 | — | 46 | 47 | 98.5 | 91.2 |
| Strain at Yield, % | 6.3 | 4.0 | — | 4.7 | 4.9 | 4.6 | 4 |
| Stress at Break, MPa | 83.4 | 73 | 76 | 46 | 43 | 91 | 83.3 |
| Strain at Break, % | 11.3 | 3.9 | 3.7 | 4.8 | 18.5 | 8.3 | 5.8 |

Ingredient quantities are given in wt % based on the total weight of the composition.

What is claimed is:
1. A portable electronic device cover comprising a renewable thermoplastic composition comprising:
   a) 70.1 to 100 wt % of at least one polyamide selected from the group consisting of polyamide 9,10; polyamide 9,12; polyamide 9,14; polyamide 9,16; polyamide 9,36; polyamide 6,10; polyamide 6,12; polyamide 6,14; polyamide 6,16; polyamide 6,18; polyamide 6,36; polyamide 10,10; polyamide 10,12; polyamide 10,13; polyamide 10,14; polyamide 10,15 polyamide 10,16; polyamide 10,18; polyamide 10,36; polyamide 10T/1010; polyamide 10I/1010; polyamide 12,10; and blends thereof; the at least one polyamide having a carbon content, wherein the carbon content comprises at least 50 percent modern carbon, as determined with ASTM-D6866 method;
   b) 0 to 29.9 wt % of at least one fibrous reinforcing agent having circular type cross-section;

c) 0 to 14.9 wt % of at least one fibrous reinforcing agent having non circular type cross-section;
d) 0 to 29.9 wt % glass flake;
e) 0 to 29.9 wt % of at least one mineral reinforcing agent; and
f) 0 to 29.9 wt % of at least one impact modifier agent;
wherein the wt % of (a), (b), (c), (d), (e) and (f) are based on the total weight of the thermoplastic composition.

2. The device cover of claim 1 wherein the at least one polyamide is selected from the group consisting of polyamide 6,10; polyamide 10,10; polyamide 10T/1010; and blends thereof.

3. The device cover of claim 1 wherein the polyamide is polyamide 10,10.

4. The device cover of claim 3 wherein the polyamide has a carbon content of at least 90 percent modern carbon.

5. The device cover of claim 1 comprising 0.1 to 29.9 wt % fiberous reinforcing agent having circular type cross-section.

6. The device cover of claim 1 comprising 0.1 to 14.9 wt % fiberous reinforcing agent having non-circular type cross-section.

7. The device cover of claim 1 comprising 0.1 to 29.9 wt % of glass flake.

8. The device cover of claim 1 comprising 0.1 to 29.9 wt % of at least one mineral reinforcing agent.

9. The device cover of claim 1 comprising 0.1 to 29.9 wt % of at least one impact modifier agent.

10. The device cover of claim 1 wherein the at least one impact modifier agent is an ethylene-propylene-diene polymer grafted with 1 to 5 wt % maleic anhydride.

* * * * *